United States Patent [19]
Haugwitz et al.

[11] 3,853,894
[45] Dec. 10, 1974

[54] ISOTHIOCYANOBENZIMIDAZOLES

[75] Inventors: Rudiger D. Haugwitz, Titusville; Venkatachala L. Narayanan, Hightstown, both of N.J.

[73] Assignee: E. R. Squibb & Sons, Inc., Princeton, N.J.

[22] Filed: June 22, 1973

[21] Appl. No.: 372,870

Related U.S. Application Data

[63] Continuation-in-part of Ser. No. 259,058, June 2, 1972.

[52] U.S. Cl. ... 260/294.8 C, 260/296 B, 260/309.2, 260/296 R, 424/263
[51] Int. Cl. ............................................. C07d 31/50
[58] Field of Search ................... 260/294.8 C, 309.2

[56] References Cited
UNITED STATES PATENTS
3,586,670  6/1971  Brenneisen et al. ......... 260/309.2 X FOREIGN PATENTS OR APPLICATIONS
1,198,941  7/1970  Great Britain .................. 260/309.2

OTHER PUBLICATIONS

Brenneisen et al., Chem. Abstracts, Vol. 71, (13), 61,372k Sept. 29, 1969.

*Primary Examiner*—Alan L. Rotman
*Attorney, Agent, or Firm*—Lawrence S. Levinson; Merle J. Smith; Donald J. Barrack

[57] ABSTRACT

Isothiocyanobenzimidazoles are provided having the structure

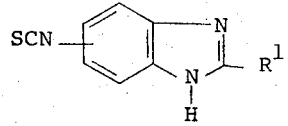

wherein $R^1$ is pyridine or a pyridine derivative, which are useful as anthelmintic agents.

10 Claims, No Drawings

ISOTHIOCYANOBENZIMIDAZOLES

This application is a continuation-in-part of U.S. Pat. application Ser. No. 259,058 filed June 2, 1972.

BRIEF DESCRIPTION OF THE INVENTION

The present invention relates to isothiocyanobenzimidazoles having the structure (I) 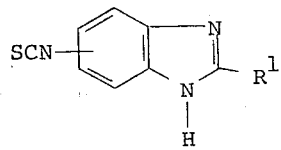

wherein $R^1$ is pyridine, pyridine substituted with an alkyl group containing 1 to 4 carbon atoms, or pyridine substituted with halogen.

The term "halogen" as used throughout the specification refers to fluorine, chlorine, bromine, and iodine; chlorine is preferred.

DETAILED DESCRIPTION OF THE INVENTION

Isothiocyanobenzimidazoles of formula I are useful as anthelmintic agents and are useful in the treatment and/or prevention of helminthiasis, a parasitic disease which causes wide-spread and often serious infection in domesticated animals such as swine, horses, cattle, sheep, and goats.

The effective dosage level for treating helminthiasis ranges from about 50 to about 300 milligrams of active ingredient per kilogram of animal body weight. A dosage range of about 100 to 200 milligrams of active ingredient per kilogram of animal body weight is preferred.

The isothiocyanobenzimidazoles of formula I are prepared by reacting a benzimidazole of the formula (II) 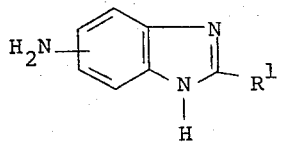

with a reagent capable of introducing a thiocarbonyl group into the amino group. The reaction is carried out in the presence of a solvent of diluent which is inert to the reactants, e.g., benzene, chloroform, and ethers.

Thus, for example, the aminobenzimidazole of formula II can be reacted with a thiocarbamic acid derivative having the formula

Hal—CS—Y (III)

wherein Hal is Cl or Br and Y represents Cl, Br or a dialkylamino group. Examples of compounds of formula III include phosgene and N,N-diethylthiocarbamoyl chloride.

Where thiophosgene is employed in the above reaction, the reaction is carried out a temperatures ranging from about 0 to about 60°C preferably in the presence of an acid binding agent such as calcium carbonate, triethylamine or sodium carbonate, according to the procedure described in Houben-Weyl's *Methoden Der Organischen Chemie*, 4th Edition, Vol. 9, pages 876 and ff (1955) and according to O. E. Schultz in Arch. Pharm. 295, 146–151 (1962).

Where N,N-diethylthiocarbamoyl chloride is employed to react with a compound of formula II, the reaction is carried out at temperatures ranging from about 40 to about 200°C according to the procedure described in J. Org. Chem. 30, 2465 (1965).

Compounds of formula I may also be prepared by reacting an aminobenzimidazole of formula II with a bis-thiocarbamoyl sulfide having the formula (IV) 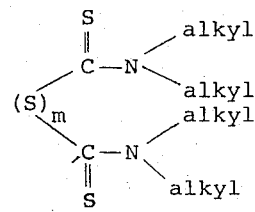

wherein $m$ is 1 or 2 and alkyl is preferably ethyl, in the presence of a hydrogen halide according to F. H. Marquardt, Helv. Chim. Acta, 49, 1716.

In another method for preparing compounds of formula I, the aminobenzimidazole of formula II is reacted with bis-trichloromethyl pentathiodipercarbonate according to the procedure described by R. Gottfried, Angew, Chem. 78, 985 (1966).

In still another method for preparing compounds of formula I, the aminobenzimidazole of formula II is reacted with ammonium rhodanide in the presence of gaseous hydrogen chloride according to British Patent No. 1,099,768.

The compounds of formula I can also be formed by reacting the aminobenzimidazole of formula II with phosgene and phosphorus pentasulfide according to Houben-Weyl, supra, Vol. 9, pages 867 and ff (1955).

Compounds of formula I can also be prepared by reacting the aminobenzimidazole of formula II with carbon disulfide in the presence of an inorganic or organic base, whereby the amino group is first converted into the corresponding dithiocarbamic salt which is subsequently dehydrosulfurized to the isothiocyano group. The dehydrosulfurization following the reaction with carbon disulfide and base can be performed oxidatively with metal salts (British Patent No. 793,802, Dutch Patent No. 81,326) e.g., with lead, copper, zinc or iron III-salts, iodine, alkali metal hypochlorites or chlorites, preferably with sodium and potassium salts (French Patent No. 1,311,855), or with suitable acid halides such as phosgene and phosphorus oxychloride (D. Martin, et al, Chem. Ber. 98, 2425–2426 (1965)), or with $Cl_2$ and ammonium sulfide (DAS 1,192,189) or with chloramine T (British Pat. No. 1,024,913).

In yet another method for preparing the compounds of formula I, the aminobenzimidazole of formula II can be reacted with ammonium rhodanide and benzoyl chloride leading first to the thiourea derivative which is then thermally decomposed, e.g., in boiling chlorobenzene, to the isothiocyano derivative. This reaction is performed, e.g., according to Houben-Weyl, supra, 4th Edition, Vol. 9, pages 867 and ff (1955).

Compounds of formula I can also be prepared by reacting the aminobenzimidazole of formula II with carbon disulfide and dicyclohexylcarbodiimide in the presence of a tertiary amine according to J. C. Jochims, Chem. Ber. 101, 1746 (1968).

The aminobenzimidazoles of formula II are most conveniently prepared from the corresponding nitro derivative having the formula (V) 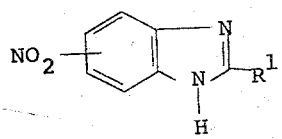

Reduction of the nitrobenzimidazoles of formula V to the corresponding aminobenzimidazole of formula II is accomplished using procedures well known in the art. Exemplary of such procedures is the use of catalytic hydrogenation using, for example, platinum oxide or palladium as the catalyst.

The nitrobenzimidazoles of formula V can be prepared using any one of several known processes listed below:
1. Formation from o-phenylenediamines and carboxylic acids, acid anhydrides, esters or amides in
   a. dilute hydrochloric acid [J. Chem. Soc., 2393 (1928)]
   b. polyphosphate ester (PPE) [Chem. Pharm. Bull. (Tokyo) 12 (7) 773 (1964)]
   c. polyphosphoric acid (PPA) [J. Am. Chem. Soc. 79, 427, (1957)].
2. Formation from o-phenylenediamines and imino ethers [J. Med. Chem., 9, 788 (1966)], [J. Org. Chem. 27, 2163 (1962)].
3. Formation from o-phenylenediamines and aldehydes in the presence of
   a. cupric acetate [Ber. 69, 2263 (1936)]
   b. lead tetraacetate [J. Med. Chem. 9(5) 751 (1966)].
4. Additional routes for the preparation of a substituted benzimidazole of formula V are outlined in Weissberger's *The Chemistry of Heterocyclic Compounds, Imidazole and Its Derivatives*, Interscience Publishers Co., New York 1953.

The compounds of formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Any other salt may then be formed from the free base and the appropriate inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate and the like.

Compounds of formula I may exist as tautomeric mixtures. The two possible forms are as shown below:

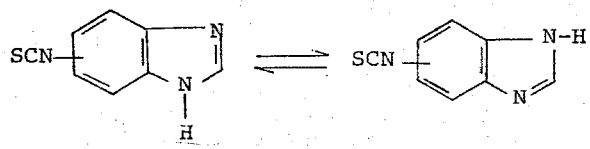

The above tautomers are obtained in proportions that differ from compound to compound.

The following examples are specific embodiments of the above described invention.

EXAMPLE 1

Isothiocyanic acid, 2-(2-pyridyl)benzimidazol-5-yl ester

A. 2-[[(2-Pyridyl)methylene]amino]-4(or 5) nitroaniline

To a solution of 6.2 g (0.04 mole) of 4-nitro-o-phenylenediamine in 500 ml of abs. EtOH there is added 4.3 g (0.04 mole) of 2-pyridine carboxaldehyde in 30 ml of abs. EtOH over a period of 5 minutes. The reaction mixture is refluxed for 3 hours and the solvent removed in vacuo. The residue is washed with MeOH and filtered to yield 4.8 g of yellow azomethine, mp 150°–152°C.

B. 2-(2-Pyridyl)-5-nitrobenzimidazole 8.8 g (0.02 mole) of lead tetraacetate is added to a solution of 4.8 g (0.02 mole) of the above produced azomethine in 300 ml of acetonitrile and the mixture is stirred at room temperature for 5 minutes. The solvent is removed in vacuo and water is added to the residue. The resulting solid is filtered off and crystallized from aqueous EtOH to yield 1.9 g, of product mp 184°–186°C.

C. Isothiocyanic acid, 2-(2-pyridyl)benzimidazol-5-yl ester

A mixture of 1.8 g of the above benzimidazole and 0.18 g of $PtO_2$ in 200 ml of abs. EtOH is reduced on the Parr hydrogenator at 50 psi until the required amount of hydrogen is absorbed. The mixture is filtered and the solvent removed in vacuo to yield an oil which is taken up in 60 ml of glyme and 20 ml of $H_2O$, 0.75 g of $CaCO_3$ and then 0.58 ml of $Cl_2C=S$ is added at 0°C. The mixture is stirred for 2 hours at room temperature. The resulting solid is filtered off and chromatographed on an Alumina Act IV column. Elution with $Et_2O$ and then $CHCl_3$ yields the product which is crystallized from $CHCl_3$—$Et_2O$ to yield 0.65 g, mp 187–189°C.

Anal. Calc'd for $C_{13}H_8N_4S$: C, 61.89; H, 3.20; N, 22.20

Found: C, 61.62; H, 3.48; N, 22.00.

EXAMPLE 2

Isothiocyanic acid, 2-(4-pyridyl)benzimidazol-5-yl ester

A. 2-[[(4-Pyridyl)methylene]amino]-4(or 5) nitroaniline

A mixture of 15.3 g (0.1 mole) of 4-nitro-o-phenylenediamine and 10.7 g of 4-pyridinecarboxaldehyde is refluxed in 500 ml of abs. EtOH for 2.5 hours. The mixture is cooled and filtered to yield 19.5 g of yellow azomethine.

B. 2-(4-Pyridyl)-5-nitrobenzimidazole

A mixture of 12.1 g (0.05 mole) of the above azomethine and 36 ml of nitrobenzene is refluxed for 1 hour. The mixture is cooled and the precipitate which forms is filtered off, washed with $Et_2O$ and crystallized from abs. EtOH to yield 9.3 g of benzimidazole, mp 274°–276°C.

C. Isothiocyanic acid, 2-(4-pyridyl)benzimidazol-5-yl ester

A mixture of 7.2 g (0.03 mole) of the above benzimidazole and 0.07 g of $PtO_2$ in 200 ml of abs. EtOH is reduced on the Parr hydrogenator at 50 psi until the theoretical amount of hydrogen is absorbed. The solution is filtered and the EtOH removed in vacuo. The residue is taken up in 80 ml glyme and 40 ml water, 3.0 g (0.03 mole) of $CaCO_3$ is added, and 2.4 ml (0.03 mole) of thiophosgene is added dropwise at 0°C. After stirring for 2 hours, the glyme is removed in vacuo at room temperature and the residue is dried and chromatographed on an Alumina Act IV column. Elution with acetone yields the product which is crystallized from acetonitrile to give 0.9 g, mp 236°–238°C.

Anal. Calc'd for $C_{13}H_8N_4S$: C, 61.89; H, 3.20; N, 22.20

Found: C, 61.63; H, 3.32; N, 22.32.

EXAMPLE 3

Isothiocyanic acid, 2-(3-pyridyl)benzimidazol-5-yl ester

A. 2-[[(3-Pyridyl)methylene]amino]-4-(or 5) nitroaniline

A mixture of 15.3 g (0.1 mole) of 4-nitro-o-phenylenediamine and 10.7 g of 3-pyridinecarboxyaldehyde is refluxed in 450 ml of abs. EtOH for 1.5 hours. The mixture is cooled and the yellow azomethine is filtered off to yield 17 g of product, mp 207°–213°C.

B. 2-(3-Pyridyl)-5-nitrobenzimidazole

A mixture of 12.1 g (0.05 mole) of the above azomethine and 36 ml of nitrobenzene is refluxed for 1 hour. The mixture is cooled and the precipitate which forms is filtered off, washed with $Et_2O$, and crystallized from abs. EtOH to yield 9.2 g of the benzimidazole, mp 268°–270°C.

C. Isothiocyanic acid, 2-(3-pyridyl)benzimidazol-5-yl ester

A mixture of 6.6 g (0.027 mole) of the above benzimidazole and 0.07 g of $PtO_2$ in 200 ml of abs EtOH is reduced on the Parr hydrogenator at 50 psi until the theoretical amount of hydrogen is absorbed. The solution is filtered and the EtOH removed in vacuo. The residue is taken up in 80 ml glyme and 40 ml water, 3.0 g (0.03 mole) of $CaCO_3$ is added, and 2.4 ml (0.03 mole) of thiophosgene is added dropwise at 0°C. After stirring for 2 hours, the glyme is removed in vacuo at room temperature and the residue is dried and chromatographed on Alumina Act IV. Elution with $CHCl_3$ yields the product which is crystallized from EtOAc to give 1.1 g, mp 258°–260°C.

Anal. Calc'd for $C_{13}H_8N_4S$: C, 61.89; H, 3.20; N, 22.20

Found: C, 61.97; H, 3.29; N, 22.41.

EXAMPLE 4

Isothiocyanic acid, 2-(6-methyl-2-pyridyl)benzimidazol-5-yl ester

A. 2[[(6-Methyl-2-pyridyl)methylene]amino]-4-(or 5) nitroaniline

A mixture of 15.3 g (0.1 mole) of 4-nitro-o-phenylenediamine and 12.1 g (0.1 mole) of 6-methyl-2-pyridinecarboxaldehyde is refluxed in 500 ml of abs. EtOH for 2 hours, cooled, and the resulting solid is filtered off and dried in a yield of 11.2 g, mp 157°–160°C.

B. 2-(6-Methyl-2-pyridyl)-5-nitrobenzimidazole

A solution of 11.0 g (0.045 mole) of the azomethine in 50 ml of nitrobenzene is refluxed for 1 hour. The mixture is cooled and poured onto 400 ml of crushed ice. After the ice is melted, the resulting solid is filtered off and crystallized from abs EtOH in a yield of 5.0 g, mp 168°–170°C.

C. Isothiocyanic acid, 2-(6-methyl-2-pyridyl) benzimidazol-5-yl ester

A mixture of 4.5 g (0.018 mole) of 5-nitro-2-(6-methyl-2-pyridyl)-benzimidazole and 0.45 g of $PtO_2$ in 200 ml of abs. EtOH is reduced on the Parr hydrogenator at 50 psi until the theoretical amount of hydrogen is absorbed. The mixture is filtered and the EtOH removed in vacuo. A mixture of 80 ml of glyme and 40 ml of $H_2O$ is added to the residue, the solution is cooled to 0°C, and 1.8 g $CaCO_3$ is added. 1.4 ml Thiophosgene is added dropwise and the mixture is stirred for 2 hours. The glyme is removed in vacuo at room temperature. The resulting product is filtered, dried, and crystallized from $Et_2O$ in a yield of 3.0 g, mp 157°–159°C.

Anal. Calc'd for $C_{14}H_{10}N_4S$: C, 63.15; H, 3.78; N, 21.04

Found: C, 63.06; H, 4.04; N, 21.31.

EXAMPLE 5

Isothiocyanic acid, 2-(4-propyl-2-pyridyl)benzimidazol-5-yl ester

A. 2-(4-Propyl-2-pyridyl)-5-nitrobenzimidazole

A mixture of 3,4-diaminonitrobenzene (0.01 mole) and 4-propyl-2-pyridyl carboxylic acid (0.015 mole) is heated in an oil bath at 170° for 3 hours. The mixture is diluted with water and neutralized. The resulting solid is filtered off and crystallized.

B. Isothiocyanic acid, -2(4-propyl-2-pyridyl)benzimidazol-5-yl ester

Following the procedure of Example 1, Part C and substituting 2-(4-propyl-2-pyridyl)-5-nitrobenzimidazole for 2-(2-pyridyl)-5-nitrobenzimidazole the title compound is obtained.

EXAMPLE 6

Isothiocyanic acid, 2-(4-chloro-2-pyridyl)benzimidal-5-yl ester

A. 2-[[(4-Chloro-2-pyridyl)methylene]amino]-4-(or 5) nitroaniline

Following the procedure of Example 1, Part A and substituting 4-chloro-2-pyridine carboxaldehyde for 2-pyridine carboxaldehyde the title compound is obtained.

B. 2-(4-Chloro-2-pyridyl)-5-nitrobenzimidazole

Following the procedure of Example 1, Part B and substituting 2-[[(4-chloro-2-pyridyl)methylene]amino]-4 (or 5) nitroaniline for 2-[[(2-pyridyl)methylene]amino]-4 (or 5) nitroaniline the title compound is obtained.

C. Isothiocyanic acid, 2-(4-chloro-2-pyridyl) benzimidazol-5-yl ester

Following the procedure of Example 2, Part C and substituting 2-(4-chloro-2-pyridyl)-5-nitrobenzimidazole for 2-(4-pyridyl)-5-nitrobenzimidazole the title compound is obtained.

What is claimed is:

1. A compound having the formula

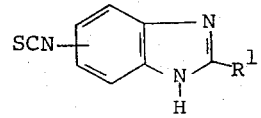

wherein $R^1$ is selected from the group consisting of pyridine, pyridine substituted with an alkyl group of 1 to 4 carbon atoms, and pyridine substituted with halogen, or a physiologically acceptable acid-addition salt thereof.

2. A compound in accordance with claim 1 wherein $R^1$ is pyridine.

3. A compound in accordance with claim 1 wherein $R^1$ is pyridine substituted with an alkyl group of 1 to 4 carbon atoms.

4. A compound in accordance with claim 1 wherein $R^1$ is pyridine substituted with halogen.

5. A compound in accordance with claim 1 having the name isothiocyanic acid, 2-(2-pyridyl)benzimidazol-5-yl ester.

6. A compound in accordance with claim 1 having the name isothiocyanic acid, 2-(4-pyridyl)benzimidazol-5-yl ester.

7. A compound in accordance with claim 1 having the name isothiocyanic acid, 2-(3-pyridyl)benzimidazol-5-yl ester.

8. A compound in accordance with claim 1 having the name isothiocyanic acid, 2-(6-methyl-2-pyridyl)benzimidazol-5-yl ester.

9. A compound in accordance with claim 1 having the name isothiocyanic acid, 2-(4-propyl-2-pyridyl)benzimidazol-5-yl ester.

10. A compound in accordance with claim 1 having the name isothiocyanic acid, 2-(4-chloro-2-pyridyl)benzimidazol-5-yl ester.

* * * * *